H. E. WILLSIE.
METHOD FOR UTILIZING SOLAR ENERGY.
APPLICATION FILED NOV. 5, 1903.
1,101,001. Patented June 23, 1914.
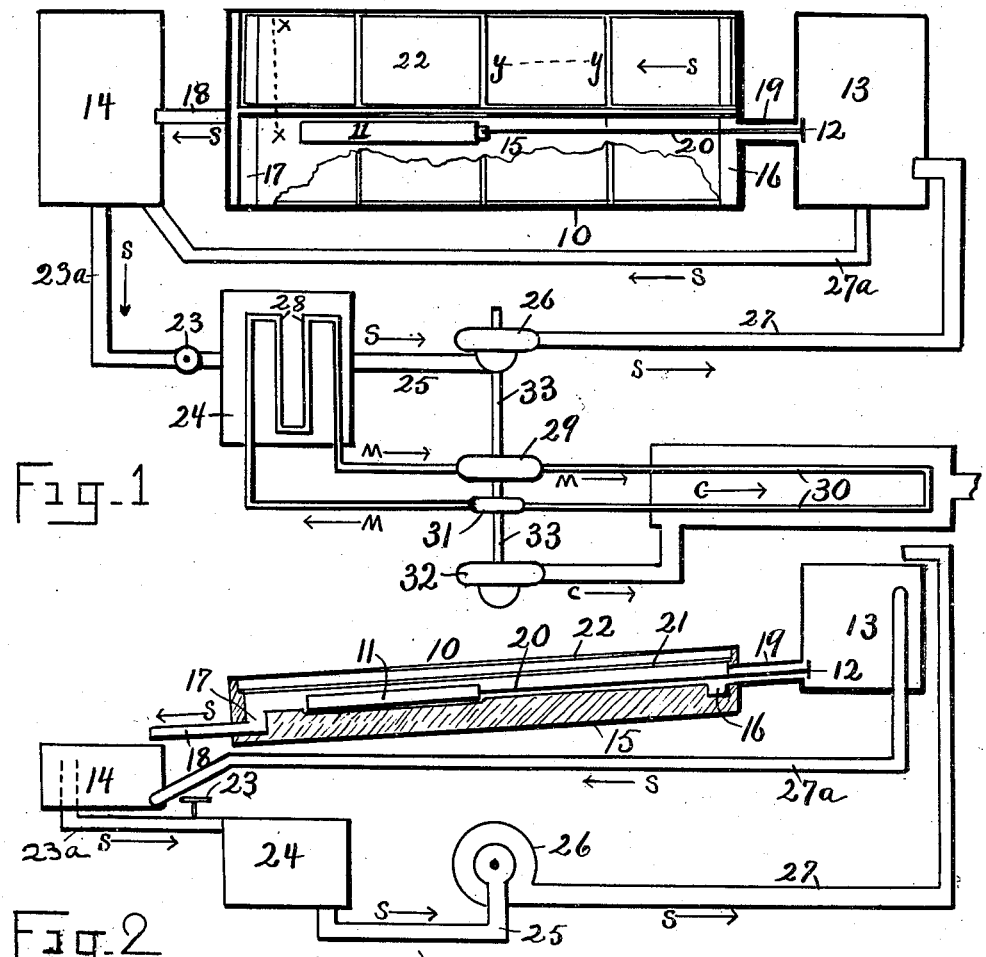
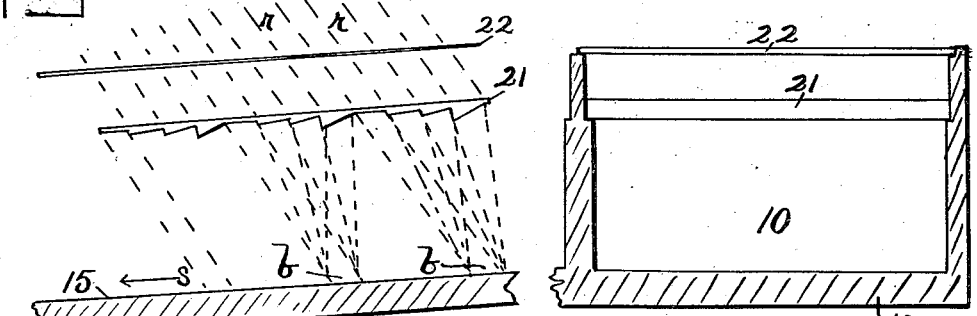
WITNESSES:
INVENTOR
H. E. Willsie

UNITED STATES PATENT OFFICE.

HENRY E. WILLSIE, OF NEW YORK, N. Y.

METHOD FOR UTILIZING SOLAR ENERGY.

1,101,001.  Specification of Letters Patent.  Patented June 23, 1914.

Application filed November 5, 1903. Serial No. 179,884.

*To all whom it may concern:*

Be it known that I, HENRY E. WILLSIE, a citizen of the United States, and resident of New York, in the county of New York and State of New York, have invented certain new and useful Improvements in Methods for Utilizing Solar Energy, of which the following is a specification.

My invention relates to improvements in solar apparatus in which solar heat is collected and stored for the purpose of doing useful work.

The objects of my invention are to provide methods for the collection of intermittent and diffuse solar rays, for the storage of such heat and for its subsequent use. I attain these objects by the devices shown in the accompanying drawing, in which—

Figure 1 is a diagrammatical plan of the entire apparatus; Fig. 2, a diagrammatical elevation of the heat collecting and storage devices; Fig. 3, a sectional view along the line $y$—$y$; and Fig. 4, a sectional view along the line $x$—$x$.

Similar characters refer to similar parts throughout the several views.

The operation of my invention is as follows: The sun's rays shining through the transparent cover of the solar heater 10 raise the temperature therein until the thermostat 11 opens the valve 12 permitting water in the reservoir 13 to flow through the solar heater and thus become heated. This solar heated water passes in to the insulated reservoir 14 where it is stored for use. The solar heater shown consists of an inclined receptacle 15 adapted to hold water or oil or other heat collecting liquids and also adapted to prevent the escape of heat. At the head of the incline is a distributing trough 16 and at the foot of the incline is a collecting trough 17. The distributing trough is connected to the reservoir 13 by the pipe 19, and the collecting trough is connected to the reservoir 14 by the pipe 18. The thermostat 11 consists of a cylinder partly filled with an expansible substance like oil or mercury acting against a piston connected by the rod 20 to the valve 12. Its function is to regulate the water flowing through the solar heater in proportion to the amount of solar heat received, so that the heated water stored in reservoir 14 will have a predetermined temperature. The function of the distributing trough 16 is to arrange the water in a thin film or layer over the bed of the heater.

To obtain higher temperatures than may be had by the use of the plain window glass cover, 22, the solar heater prism glass 21 is used for part of the transparent cover. This prism glass concentrates the parallel solar rays, $r$, $r$, into bands or lines, $b$, of higher temperature. The water flowing through these lines or bands of higher temperature acquires heat. This construction is shown in Figs. 3 and 4. In Fig. 1 part of the glass cover is broken away.

When it is desired to use the heat stored in the reservoir 14 the valve 23 is opened permitting the solar heated water to flow through the pipe 23$^a$ into the chamber 24 where heat is taken from it. The cooled water is taken from the bottom of the chamber through the pipe 25 to the centrifugal 26 which elevates it through the pipe 27 into the reservoir 13 to begin again the heating cycle.

Within the reservoir 24 is a vaporizer 28, adapted to contain sulfur dioxid or other volatile liquid, connected to the vapor turbine of motor 29. The exhaust from this turbine is liquefied in the condenser 30 and returned to the vaporizer by the feed pump 31.

To illustrate a means of doing useful work, the centrifugal pump 32 is attached to the shaft 33, driven by the turbine 29. The pump 32 is adapted to lift water from a well, flow it about the condenser and then out upon land to be irrigated.

The arrows marked S show the direction of flow of the solar heat collecting water or liquids. The arrows lettered M show the direction of flow of the motor fluid. The arrows marked C show the flow of cooling water through the condenser.

In the above described manner may diffuse and intermittent solar rays be converted into continuous and uniform power.

What I claim and desire to secure by Letters Patent is:

1. The method herein described, of transforming solar heat into practically continuous mechanical power which consists in, first, collecting the diffuse and varying solar heat rays by forcibly circulating a substance A, in amounts to correspond with the solar heat variations, over a large area exposed to solar heat and then temporarily accumulating the solar heated substance A in an insulated reservoir; second, generating from a fluid B a vapor with pressure to operate an engine with a surface condenser cycle, by continuously bringing such quantities of substance A into proximity of fluid B as will transfer from substance A to fluid B the heat required for the desired operation of the engine.

2. The method herein described of transforming solar heat into practically continuous mechanical power which consists in, first, concentrating the diffuse solar rays into zones of higher temperatures in a solar heater, collecting the concentrated solar heat by forcibly circulating a substance A, in amounts to correspond with the solar heat variations, over a large area exposed to solar heat and temporarily accumulating the solar heated substance A in an insulated reservoir; second, generating from a fluid B a vapor with pressure to operate an engine by continuously bringing such quantities of substance A into proximity of fluid B as will transfer from substance A to fluid B the heat required for the desired operation of the engine.

3. The method of making solar heat available for practically continuous use which consists in, first, mechanically circulating a substance, exposed to the varying and diffuse solar rays, over a large area in a solar heater, and then temporarily accumulating the solar heated substance in an insulated reservoir; second withdrawing from the reservoir the heated substances in continuous quantities and removing from the substance for use a portion of the heat.

4. The method of making solar heat available for practically continuous use, which consists in, first, mechanically circulating a substance, exposed to the diffuse and varying solar rays, over a large area in a solar heater, and then temporarily accumulating the solar heated substance in an insulated reservoir; second, withdrawing from the reservoir the heated substance in continuous quantities, removing from the substance a portion of the heat and returning the substance to the reservoir.

5. The method of making solar heat available for practically continuous use which consists in first, forcibly circulating a substance exposed to the varying and diffuse solar rays over a large area in a solar heater, in amounts to correspond with the solar heat variations and then temporarily accumulating the solar heated substance in an insulated reservoir; second, withdrawing from the reservoir the heated substance in continuous quantities, and removing from the substance a portion of the heat.

6. The method of making solar heat available for practically continuous use which consists in concentrating the varying and diffuse solar rays into zones of higher temperature in a solar heater, forcibly circulating a heat absorbing substance through the zones of higher temperature in amounts to correspond with the solar heat variations, and then accumulating the solar heated substance in an insulated reservoir until the heat is needed for use.

Signed at New York in the county of New York and State of New York this thirtieth day of June A. D. 1903.

HENRY E. WILLSIE.

Witnesses:
    WALTER COX,
    FREDERICK HOWELL.